United States Patent [19]

Tajima et al.

[11] 3,882,405

[45] May 6, 1975

[54] ANALOG SIGNAL COMPARATOR CIRCUIT

[75] Inventors: Mutsunari Tajima; Isao Komatsu, both of Tokyo, Japan

[73] Assignee: Nippon Electric Company, Ltd., Tokyo, Japan

[22] Filed: Apr. 3, 1973

[21] Appl. No.: 347,592

[30] Foreign Application Priority Data

Apr. 7, 1972 Japan .............................. 47-035450

[52] U.S. Cl. ............. 328/146; 307/235 R; 307/237; 328/149

[51] Int. Cl. .......................... H03k 5/08; H03k 5/20

[58] Field of Search ............................ 328/146–149; 307/235 R, 237

[56] References Cited

UNITED STATES PATENTS

| | | | |
|---|---|---|---|
| 2,946,961 | 7/1960 | Lind | 328/146 |
| 3,372,234 | 3/1968 | Bowsher et al. | 328/146 X |
| 3,482,234 | 12/1969 | Doniger et al. | 328/148 X |
| 3,551,746 | 12/1970 | Rubner | 307/235 X |

*Primary Examiner*—John Zazworsky
*Attorney, Agent, or Firm*—Sughrue, Rothwell, Mion, Zinn & Macpeak

[57] ABSTRACT

An analog comparator circuit for comparing the levels of two analog signals and providing an output which depends upon the difference in the levels of the two signals. The comparison is made within the minimum resolution capability of the comparator. A clamping means is provided to limit the minimum analog level which will cause the comparator to switch from one output to another. The limit is set independently on the minimum resolution of the comparator.

3 Claims, 10 Drawing Figures

ANALOG SIGNAL COMPARATOR CIRCUIT

BACKGROUND OF THE INVENTION

The present invention relates to an analog signal comparator circuit operable to compare the levels of two audio signals and is particularly adapted for use in equipment, such as speaker telephones and echo suppressors, which have switches controlled by audio signals.

One generally known circuit for comparing the levels of audio signals is shown in block form in FIG. 1. This circuit comprises two rectifier/smoother circuits 101 and 102, and a comparator 103. These two rectifier/-smoother circuits have their output terminals connected serially, with polarities reversed, thereby providing a difference voltage between the two input signals supplied. This difference voltage is compared with a reference voltage in the comparator.

The function of the level comparison circuit of FIG. 1 is to judge in which region, i.e., higher or lower region than the boundary represented by the following equation (1), the output voltage $E_{01}$ and $E_{02}$ of the circuits 101 and 102 respectively, are present:

$E_{01} = E_{02} + E_R$, where $E_R$ represents the resolution of the comparator 103. In other words, the relationship $E_{01} > E_{02}$ is judged when $E_{01} > E_{02} + E_R$. While, the relationship $E_{01} < E_{02}$ is judged with $E_{01} \leqq E_{02} + E_R$. These relationships are depicted graphically in FIG. 2(a), in whose hatched region $E_{01}$ is approximately equal to $E_{02}$ or the difference between $E_{01}$ and $E_{02}$ is indefinite. In the drawing, this region is assumed to lie in the region of $E_{01} < E_{02}$. For judging the boundary, only Eq. (1) is considered.

This boundary may be expressed in decibel scales as shown in FIG. 2(*b*). Assuming that $20 \log_{10} E_{01} = L_1$, $20 \log_{10} E_{02} = L_2$, and $20 \log_{10} E_R = L_R$, Eq. (1) may be rewritten in decibels as follows.

$$L_1 = L_2 + 20 \log_{10} (1 + (E_R/E_{02})) \quad \ldots (2)$$

In Eq. (2) the second term on the right side approaches zero as $E_{02}$ increases (or $L_2$ increases). Thus, the relationship $L_1 = L_2$ holds in the region where $E_{02} >> E_R$. This condition is expressed by the straight line in the region for higher-level signals in FIG. 2(*b*). While, if $E_{02}$ becomes smaller to the extent that it becomes approximately equal to $E_R$, then Eq. (2) will be $L_1 = L_2 + 6$. If $E_{02} = 0$, in the extreme case, then $E_{01} = E_R$ or $L_1 = L_R$.

Hence, the prior art circuit shown in FIG. 1 is characterized by the following relationships summarized from the foregoing, as depicted in FIG. 2(*b*):

1. $L_1 = L_R$, when $L_2 = -\infty$ (no input);
2. $L_1 = L_2 + 6$, when $L_2 = L_R$; and
3. $L_1 = L_2$, when $L_2 >> L_R$.

Generally, in the device having switches or the like controlled by audio signals, the determination of the level relationship between output voltages should be as accurate as possible. For this purpose, the boundary characteristic should be as linear as possible as indicated by the dotted line 201 in FIG. 2(*b*). The linearity can be improved by reducing the resolution voltage, $E_R$, of the comparator. However this can have adverse effects in devices such as voice switches. As can be seen from FIG. 2*b*, very low input voltages will "exceed" the boundary when $L_1 > L_R$. Thus $L_R$ constitutes the minimum switching threshold. By lowering $E_R$, and consequently $L_R$, too much, the voice switch or other device may switch in response to noise. Thus, it can be seen that the resolution, $E_R$, of the comparison should be small to improve linearity but relatively large to minimize noise switching.

An analog signal comparison circuit is often used for the purpose of comparing the voice levels in the transmission and reception paths, in a device having a voice-operated switch e.g., an echo suppressor, speaker telephone, etc. In the illustrated prior art circuit, $L_1$ (a level on the transmission side) must exceed $L_2$ (a level on the reception side) by 6 dB maximum in the vicinity of the threshold level ($L_2 = L_R$ of FIG. 2(*b*)) in order for the system to be on the $L_1 > L_2$ side of the boundary. This means that the sensitivity of breaking-in transmission signal is equivalently reduced.

This reduction in sensitivity in the vicinity of the threshold level often causes speech mutilation or speech clipping of the leading part (front end) of a voice transmission. This is because the leading part of a voice transmission is typically a low power consonant sound. If the voice switch requires voice-out (transmission) to be 6 dB above voice-in (reception) in order to cause break-in, it can be seen that the leading part, being low in power, will often fail to activate the voice switch and be lost to the transmission. As well-known, a voice waveform has at its leading part a consonant portion of several milliseconds to several tens of milliseconds, and the energy of this consonant portion is very small compared with that of the vowel portion. It is to be noted that this consonant portion is largely responsible for the speech articulation. Therefore, the speech mutilation or clipping at the consonant portion seriously deteriorates the speech articulation. When viewed from this standpoint, it is most essential to give consideration not to unreasonably lower the sensitivity on the break-in side in the device performing the voice-operated switching so that the transmission quality is maintained high in view of the subjective evaluation.

SUMMARY OF THE INVENTION

In view of the foregoing, a principal object of the invention is to provide an analog signal comparator circuit capable of operating in a linear judging boundary characteristic within a predetermined level range, and having a threshold level predetermined independently of the resolution of the comparator.

In accordance with the present invention a signal comparison circuit is provided having a minimum threshold that is independent and greater than the resolution of the comparator. The two signals to be compared are fed to rectifier and smoother circuits. The output of at least one of said rectifier and smoother circuits is clamped at a level above the resolution level of the comparator. The clamped level serves as a minimum threshold for the comparator. When the clamped signal is larger than the threshold, the comparator output is determined by the relative magnitudes of the outputs from the rectifier and smoother circuits and the resolution level. When the clamped signal is lower than the threshold, the comparator output is determined by the relative magnitudes of the unclamped output, the threshold level and the resolution level.

BRIEF DESCRIPTION OF THE DRAWINGS

Referring to FIG. 3, there is shown one example of an analog signal comparator circuit of the invention wherein the reference numerals 301 and 301′ denote input terminals of a first rectifier/smoother circuit 311; and 302 and 302′, output terminals of the first rectifier/smoother circuit 311, the terminal 302 being positive, and 302′ negative. The numerals 303 and 303′ indicate input terminals of a second rectifier/smoother circuit 312. These terminals 303 and 303′ correspond to the input terminals 301 and 301′ of the rectifier/smoother circuit 311. Similarly, the output terminals 304 and 304′ correspond to the other output terminals 302 and 302′. In the circuit 312, the terminal 304 is negative, and 304′ positive. The symbols $E_{01}$ and $E_{02}$ represent the output voltages of circuits 311 and 312, and the arrows indicate the polarities of these voltages. The numeral 314 indicates a d-c voltage source, $E_B$ is its voltage, and the arrow shows the polarity of this voltage. The numeral 315 denotes a rectifying element; 305 and 305′, input terminals of a comparator 313; 307 and 307′, output terminals thereof; and 306, a common terminal which is grounded together with common terminals of other circuits. The comparator 313 operates in such a manner that when the sum of the voltages applied to the input terminals 305 and 305′ exceeds a given value, e.g. 0 volts the voltage at the output terminal 307 assumes a nearly constant value $E_C$. When the sum of said voltages is below 0 volts, the voltage at the output terminal 307 is nearly zero. As is well known and as explained previously, the comparison is not an exact comparison because of the resolution level, $E_R$, of the comparator. Thus, while an output $E_C$ generally represents that $E_{01} > E_{02}$, because of the resolution of the comparator, the comparator will provide an output $E_C$ only if $E_{01} > E_{02} + E_R$. This kind of comparator may be constituted of a differential input type d-c amplifier which is known as the operational amplifier. In FIG. 3, the sum of the voltages applied to the input terminals 305 and 305′ is the input voltage to the differential input type d-c amplifier 313. However, since $E_{02}$ is applied as a negative voltage due to the connection, the input to the amplifier is $E_{01} - E_{02}$. The rectifier 315 and battery 314 clamp the input terminal 305′ to a minimum negative value of $E_B$. This has the effect of providing the comparison circuit with a set limit value which is independent of the resolution. Consequently, the resolution level $E_R$ may be made as small as possible without the disadvantages mentioned above.

When $|E_{02}| > |E_B|$, diode 315 is reverse biased and the input to the operational amplifier is $E_{01} - E_{02}$. Thus the comparator will give an output $E_C$ when $E_{01} > E_{02} + E_R$, and $E_R$ may be made very small.

When $|E_{02}| \leq |E_B|$, diode 315 is forward biased and input 305′ is clamped at $-E_B$. The input to the operational amplifier is $E_{01} - E_B$ and the comparator gives an output $E_C$ when $E_{01} > E_B + E_R$. These operations lead to the following formulae:

1. Under the state where $|E_{02}| < |E_B|$,
   $E_C$ stands at a high level when $E_{01} - E_B - E_R > 0$, and
   $E_C$ stands at a low level when $E_{01} - E_B - E_R < 0$;
2. Under the state where $|E_{02}| > |E_B|$,
   $E_C$ stands at a high level when $E_{01} - E_{02} - E_R > 0$, and
   $E_C$ stands at a low level when $E_{01} - E_{02} - E_R < 0$.

The resolution $E_R$ of the comparator 313 can be sufficiently reduced with respect to the values of $E_{01}$, $E_{02}$ and $E_B$. Consequently, 1. Under the state where $|E_{02}| < |E_B|$,
   $E_C$ stands at a high level when $E_{01} > E_B$, and
2. Under the state where $|E_{02}| > |E_B|$,
   $E_C$ stands at a high level when $E_{01} > E_{02}$.

Figure 1:
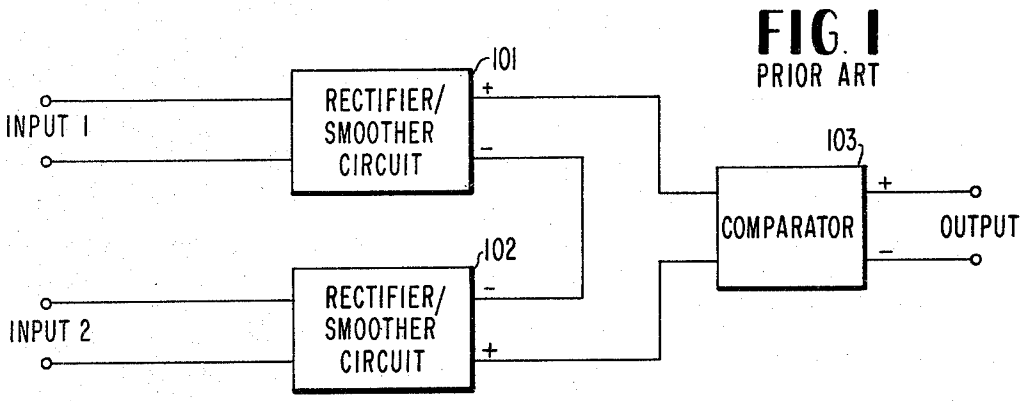
FIG. 1 PRIOR ART
FIG. 1 is a block diagram of a prior art analog comparator.
Figure 2A:
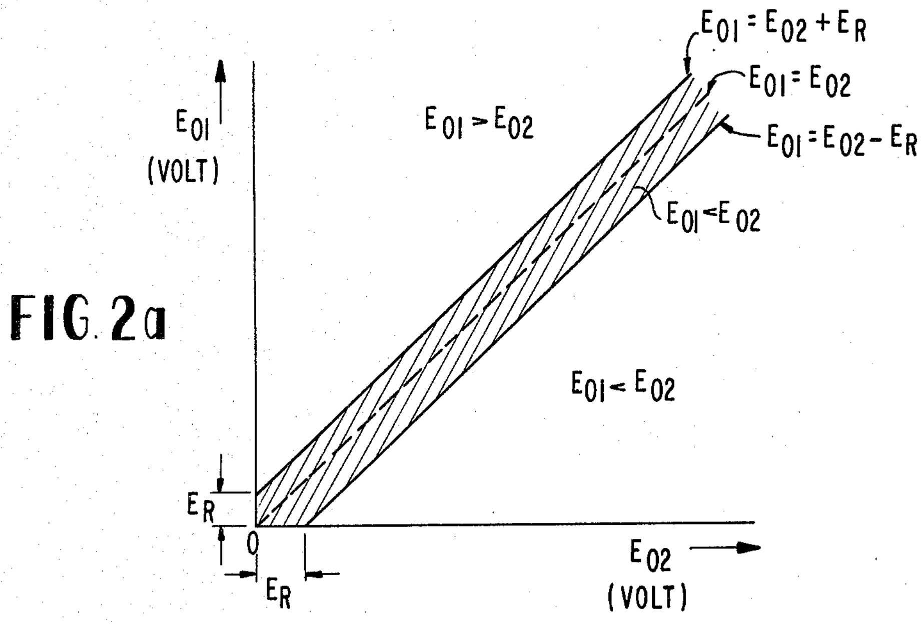
FIGS. 2*a* and 2*b* are graphs explaining the operation of the circuit of FIG. 1.
Figure 2B:
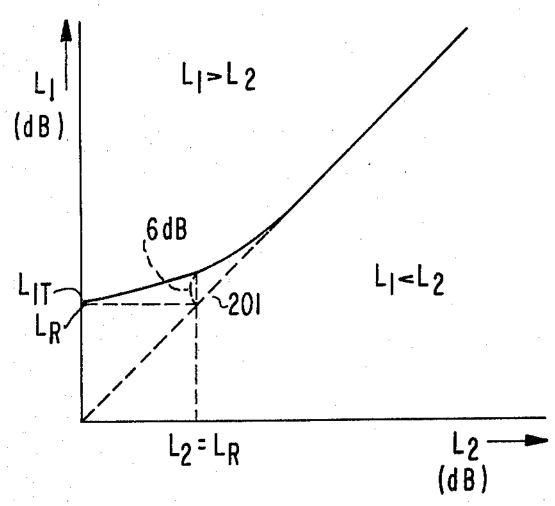
Figure 3:
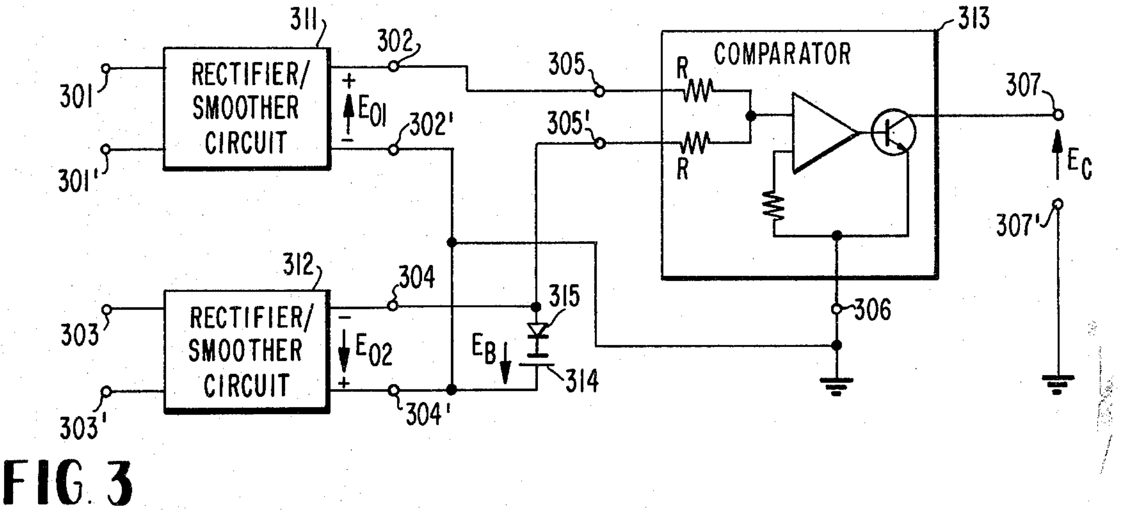
FIG. 3 is a block diagram of a first embodiment of an analog comparator circuit of the present invention.
Figure 4:
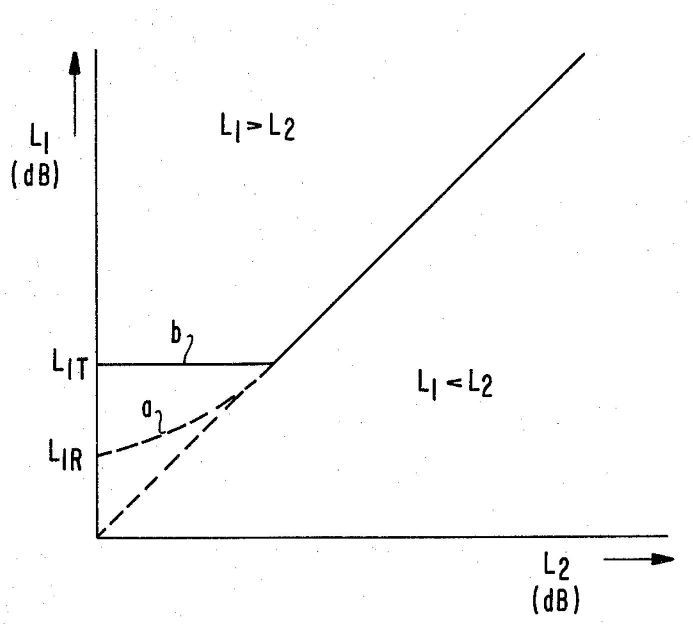
FIG. 4 is a diagram showing the characteristics of the circuit shown in FIG. 3.

FIG. 4 shows characteristics of the circuit of FIG. 3. Like reference characters in FIG. 4 are given like meaning as used in FIG. 2*b*. The solid line *b* is the switching characteristic of the circuit of this embodiment of the invention. The broken line *a* indicates the characteristic of the same circuit with the exception that the voltage source 314 and rectifying element 315 are omitted. In the prior art circuit, the deviation from the ideal characteristic ($L_1 = L_2$) on the switching diagram in the region near $L_2 = L_{1T}$ was about 6 dB. Whereas, according to the invention, it was found as low as or lower than 0.5 dB in the same region.

Figure 5:
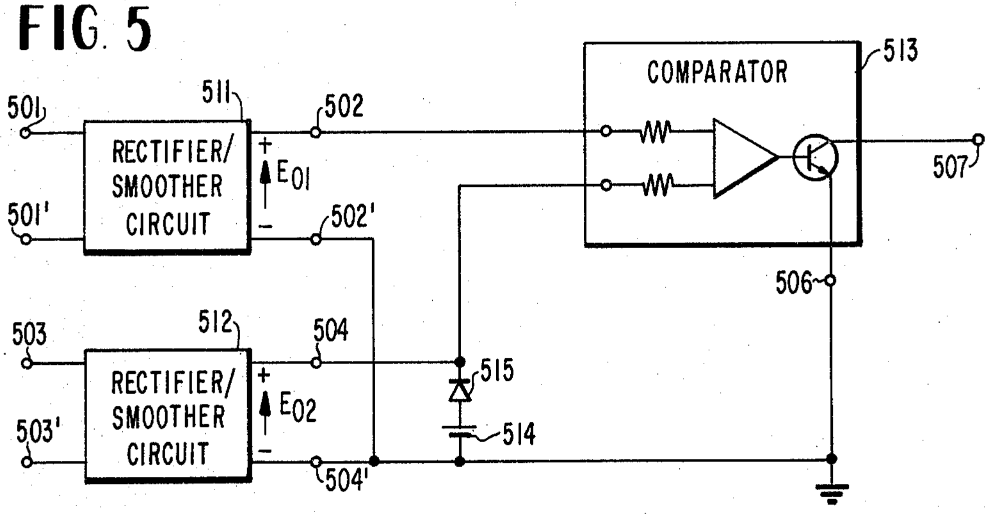
FIG. 5 is a block diagram of a second embodiment of the invention.

FIG. 5 illustrates another analog signal comparator circuit which embodies the present invention. In FIG. 5, the circuit elements used are the same as those in FIG. 3. Reference numerals 501 and 501′ correspond to 301 and 301′; 502 and 502′, to 302 and 302′ and so forth. In this embodiment, the comparator 513 operates responsive to the difference between d-c voltages applied to the input terminals 505 and 505′. Hence, the polarities of $E_{02}$ and $E_B$, the rectifying element 515 are different from those in FIG. 3. The characteristics of this circuit are identical to those shown in FIG. 4.

The foregoing embodiments use rectifier/smoother circuits. In their place, other circuits capable of providing unidirectional output, e.g., d-c amplifiers having rectifying elements in their output circuits may be used. Also, instead of the comparator, other circuits having a decision threshold level such as Schmitt trigger circuit may be used.

The circuits in the above embodiments are to detect the relationships $L_1 > L_2$ and $L_1 < L_2$. The invention proposes another embodiment to provide a circuit capable of detecting the relationship $L_1 = L_2$, in addition to the relationships $L_1 > L_2$ and $L_1 < L_2$.

Figure 6:
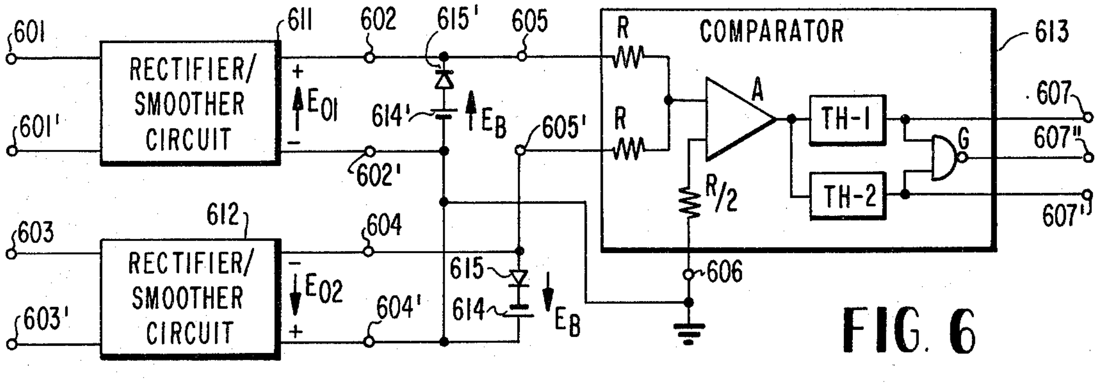
FIG. 6 is a block diagram of a third embodiment of the invention.

This embodiment is illustrated in block form in FIG. 6, wherein the numerals 601 and 601′ correspond to 301 and 301′ of FIG. 3; 603 and 603′ to 303 and 303′ and so forth. Unlike the comparator 313 of FIG. 3, the comparator 613 of this embodiment has three output terminals 607, 607′ and 607″. An output appears at the terminal 607 when $L_1 > L_2$, at the terminal 607′ when $L_1 < L_2$, or at the terminal 607″ when $L_1 = L_2$. This operation is carried out through an analog amplifier A, two threshold circuits TH-1 and TH-2, and a gate G which are comprised in the comparator 613. An analog voltage corresponding to the difference between the outputs of rectifier/smoother circuits 611 and 612 is present at the output terminal of the analog amplifier A. The threshold circuits TH-1 and TH-2 generate outputs with levels varying, high or low, according to the range of the analog voltage values. This characteristic is shown in FIG. 7.

Figures 7, 8:
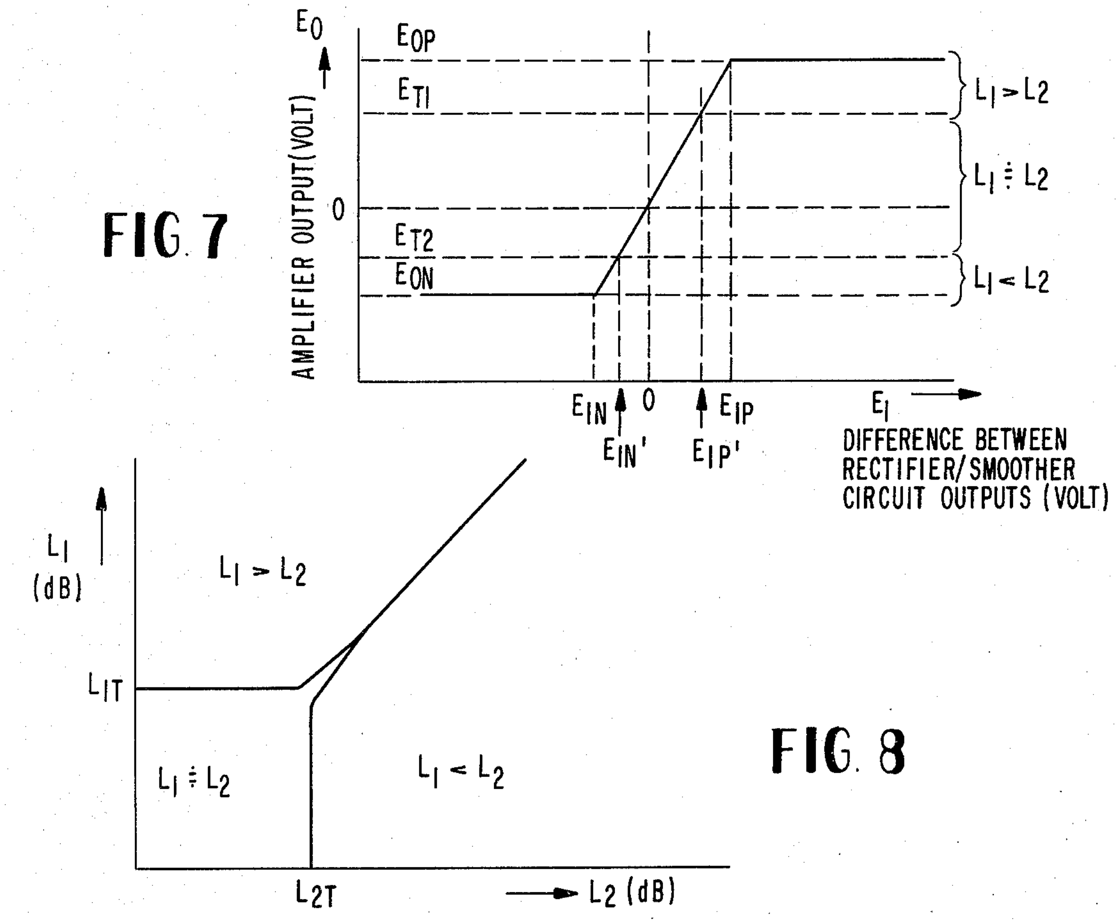
FIGS. 7 and 8 are diagrams showing characteristics of the circuit shown in FIG. 6.

In FIG. 7, the symbol $E_{1P}$ indicates an input voltage which causes the output of amplifier A to be positively saturated, and $E_{1N}$ an input voltage which causes the output thereof to be negatively saturated, $E_{OP}$ and $E_{ON}$ are the saturated output voltages. $E_{T1}$ denotes the threshold voltage of the threshold circuit TH-1, and $E_{T2}$ the threshold voltage of the threshold circuit TH-2. It is so arranged that the circuit TH-1 generates an output when $E_{T1} < E_O \leqq E_{OP}$ (where $E_O$ is the output of amplifier A). While, the circuit TH-2 delivers an output when $E_{ON} \leqq E_O < E_{T2}$. The gate G is a known NAND gate circuit which generates an output when neither of its two input terminals receive inputs. The circuit of this embodiment produces outputs in relation to the input levels as shown in the following table:

| Output | Relationship between Input Levels | | |
|---|---|---|---|
| | $L_1 > L_2$ | $L_1 \approx L_2$ | $L_1 < L_2$ |
| At terminal 607 | high level | low level | low level |
| At terminal 607'' | low level | high level | low level |
| At terminal 607' | low level | low level | high level |

FIG. 8 shows characteristics of the circuit of FIG. 6. The curved part of the characteristic near the intersection of $L_{1T}$ and $L_{2T}$ is attributed to the fact that the resolution of the comparator 613 is not substantially zero.

Figure 9:
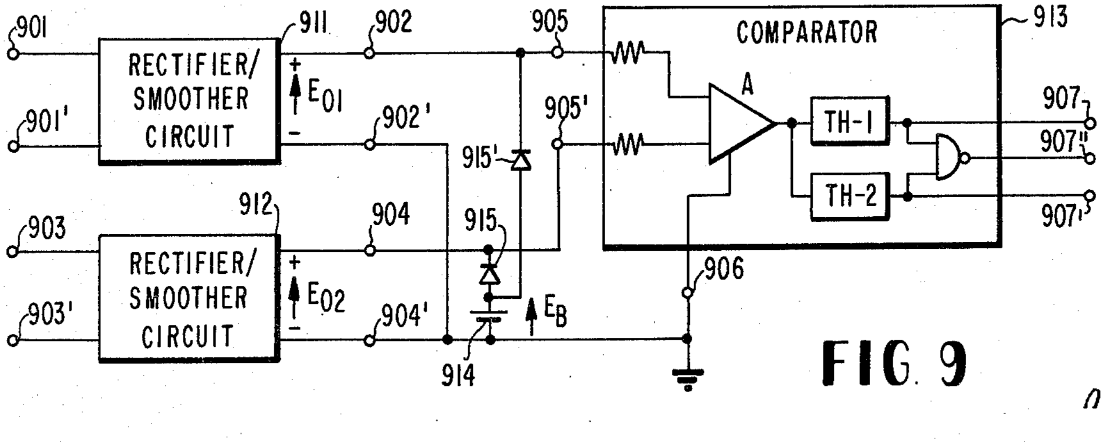
FIG. 9 is a block diagram of a fourth embodiment of the invention.

FIG. 9 shows another example of the circuit of the invention. In FIG. 9, the numerals 901 and 901' correspond to 601 and 601' in FIG. 6, and so do other elements similarly. The characteristics of this circuit are identical to those in FIG. 8.

As has been described above, the circuit of the invention is capable of accurately judging the level relationship between two input signals and at the same time making it possible to set a threshold level (such as $L_{1T}$ of FIG. 2b) independent of the resolution of the comparator.

What is claimed is:

1. An analog comparator circuit of the type which includes first means for rectifying and smoothing a first analog signal to provide a first output signal at its output, second means for rectifying and smoothing a second analog signal to provide a second output signal at its output, and a comparator means connected to receive said first and second output signals, having a minimum resolution level, and adapted to provide an output voltage which varies depending upon the difference in the absolute value of said first and second output signals, wherein the improvement comprises means connected to the output of said second means for clamping the absolute value of said second output signal to a minimum value greater than said minimum resolution level of said comparator means when said absolute value is smaller than said minimum value.

2. An analog comparator circuit as claimed in claim 1 wherein said clamping means comprises, a battery having a d.c. level above the minimum resolution of said comparator means, and a rectifier, said battery and rectifier being connected in series with each other and said series connection being connected to the output of said second means, the polarity of said battery and said rectifier being such as to maintain a voltage minimum equal to said battery voltage at said output.

3. An analog comparator circuit as claimed in claim 1 further comprising second clamping means connected to the output of said first means for clamping the absolute value of said first output signal to a minimum value greater than the minimum resolution of said comparator means when said absolute value is smaller than said minimum value.

* * * * *